United States Patent [19]

Zaenen et al.

[11] Patent Number: 5,642,522
[45] Date of Patent: Jun. 24, 1997

[54] CONTEXT-SENSITIVE METHOD OF FINDING INFORMATION ABOUT A WORD IN AN ELECTRONIC DICTIONARY

[75] Inventors: Annie E. Zaenen; Lauri J. Karttunen, both of Redwood City, Calif.

[73] Assignee: Xerox Corporation, Stamford, Conn.

[21] Appl. No.: 396,286

[22] Filed: Feb. 28, 1995

Related U.S. Application Data

[63] Continuation of Ser. No. 100,960, Aug. 3, 1993, abandoned.

[51] Int. Cl.$^6$ .................................................. G06F 17/27
[52] U.S. Cl. ............................................ 395/794; 395/759
[58] Field of Search ........................ 364/419.04, 419.05, 364/419.08, 419.1, 419.11; 395/754, 755, 759, 792, 793, 794

[56] References Cited

U.S. PATENT DOCUMENTS

| | | |
|---|---|---|
| 4,661,924 | 4/1987 | Okamoto et al. . |
| 4,864,501 | 9/1989 | Kucera et al. . |
| 4,868,750 | 9/1989 | Kucera et al. . |
| 4,942,526 | 7/1990 | Okajima et al. . |
| 4,984,178 | 1/1991 | Hemphill et al. . |
| 5,099,425 | 3/1992 | Kanno et al. . |
| 5,146,405 | 9/1992 | Church . |
| 5,243,520 | 9/1993 | Jacobs et al. . |
| 5,289,376 | 2/1994 | Yokogawa . |
| 5,295,070 | 3/1994 | Justice . |

FOREIGN PATENT DOCUMENTS

0 525 470 A2  2/1993  European Pat. Off. .

OTHER PUBLICATIONS

J.J. Hull, "*A Hidden Markov Model for Language Syntax in Text Recognition*" 11th IAPR International Conference on Pattern Recognition (Aug. 30, 1992–Sep. 3, 1992) The Hague, Netherlands Abstract No. 4297590.

Lauri Karttunen. Finite–State Constraints. International Conf. on Current Issues in Computational Linguistics. Jun. 24, 1991. pp. 1–18.

Lauri Karttunen, et al. Two–Level Morphology with Composition. Proceedings of Coling –92. Published Jul. 25–28, 1992. 10 pgs.

Lawrence R. Rabiner. A Tutorial on Hidden Markov Models and Selected Applications in Speech Recognition. Proceedings of the IEEE, vol. 77, No. 2, Feb. 1989. pp. 257–285.

Julian Kupiec. Robust part–of–speech tagging using a hidden Markov model. Computer Speech and Language. 1992. vol. 6. pp. 225–242.

*Primary Examiner*—Robert A. Weinhardt
*Attorney, Agent, or Firm*—Townsend and Townsend and Crew LLP

[57] ABSTRACT

A technique of using an electronic dictionary in conjunction with electronically-encoded running text that gives the user the most relevant information rather than belaboring the user with all possible information about a selected word. The technique maps the selected word from its inflected form to its citation form, analyzes the selected word in the context of neighboring and surrounding words to resolve ambiguities, and displays the information that is determined to be the most likely to be relevant. The dictionary preferably has information about multi-word combinations that include the selected word, and the context determination typically entails checking whether the selected word is part of a predefined multi-word combination.

7 Claims, 3 Drawing Sheets

CONTEXT-SENSITIVE METHOD OF FINDING INFORMATION ABOUT A WORD IN AN ELECTRONIC DICTIONARY

This is a continuation of application Ser. No. 08/100,960, filed Aug. 3, 1993, now abandoned.

BACKGROUND OF THE INVENTION

The present invention relates generally to computerized information retrieval devices or systems, and more specifically to techniques for using an electronic dictionary in connection with a body of electronically encoded text.

Electronically encoded dictionaries and the like have become commonplace, and find applicability both in conjunction with word processing programs and as a stand-alone reference works. However, current electronic dictionaries are typically derived from a printed dictionary and display the information in the same format. When information from the dictionary is requested, as for example, by selecting a word in the text, all the information for that word is presented. If the word has more than one syntactic category or is otherwise ambiguous, the user can determine which of the displayed information is relevant. Thus, the only advantage of the use of the electronic dictionary over a use of a printed dictionary is that the lookup is faster and the results can be displayed on the same screen that displays the text.

SUMMARY OF THE INVENTION

The present invention provides a technique of using an electronic dictionary in conjunction with electronically-encoded running text, but in a way that gives the user the most relevant information rather than belaboring the user with all possible information about a selected word.

In brief, the present invention maps the selected word from its inflected form (sometimes referred to as surface form) to a set of information including its citation form (sometimes referred to as dictionary form or lexical form), analyzes the selected word in the context of neighboring and surrounding words to resolve ambiguities, and displays the information that is determined to be the most likely to be relevant. The user is free to request additional information, in which case either the next most relevant information or all information about the selected word is provided. The dictionary preferably has information about multi-word combinations that include the selected word, and the context determination typically entails checking whether the selected word is part of a predefined multi-word combination.

In a specific embodiment, the selected word (and preferably the other words in the same sentence) is communicated to a morphological analyzer, which provides citation forms and morphological categories or tags such as parts of speech. The morphological analyzer is preferably implemented as a finite state transducer (FST). Further, the determination of the most likely relevant information is preferably determined using statistical techniques, such as a hidden Markov model (HMM).

The present invention takes advantage of the user's ability to use what makes sense in the current context. In contrast to other possible approaches, such as applying a full syntactic parser to the text, the context-sensitive filtering of dictionary information according to the present invention is not particularly demanding computationally. At the same time, by allowing the user to request additional information if the initial information does not make sense relaxes the constraint that the technique be highly accurate. This is in contrast to a context such as machine translation where even a 1–2 percent error rate would be intolerable.

A further understanding of the nature and advantages of the present invention may be realized by reference to the remaining portions of the specification and the drawings.

DESCRIPTION OF SPECIFIC EMBODIMENTS

System Overview

Figure 1:
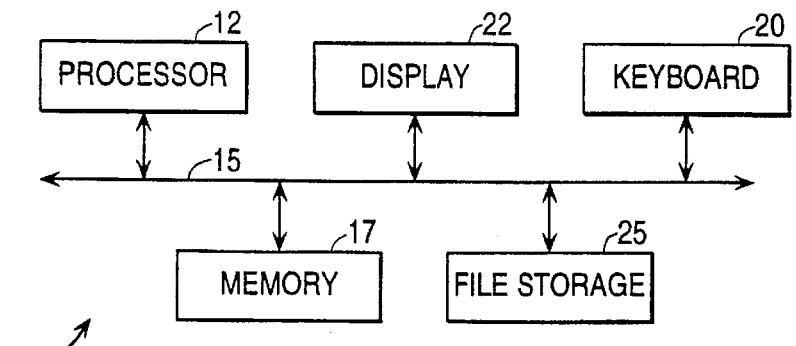
FIG. 1 is a block diagram of a prior art computer system within which the present invention may be embodied.

FIG. 1 is a block diagram of a computer system 10 within which the present invention may be embodied. The computer system configuration illustrated at this high level is standard, and as such, FIG. 1 is labeled "Prior Art." A computer system such as system 10, suitably programmed to embody the present invention, however, is not prior art. In accordance with known practice, the computer system includes a processor 12 that communicates with a number of peripheral devices via a bus subsystem 15. These peripheral devices typically include a memory 17, a keyboard or other input device 20, a display or other output device 22, and a file storage system 25 such as one or more hard disk drives and floppy disk drives.

In a typical text application, a user would be viewing a body of electronically-encoded text on the display. The text could be pre-existing material, or could be material that the user was in the process of creating or modifying. The text is normally stored on disk, and selected portions read into memory for display and manipulation. As an increasingly typical adjunct to this, the user has access to an on-line reference work such as a dictionary or thesaurus. In a typical word processing program, the user can select a word, as by highlighting the word or placing a cursor on the word, and access a thesaurus or a dictionary. In the case of a thesaurus, the user is presented with a number of synonyms of the selected word. In the case of a dictionary the user is presented with whatever information the dictionary contains for the selected word, normally a number of definitions of the selected word.

Another possibility is the use of a dictionary for translation. For example, the user may have a body of text in French and be resorting to a French-English dictionary for the purpose of reading and understanding the text or for the purpose of translating it into English. Particular examples in the description that follows will often be in this context.

As is well known, a typical word may have many definitions and may be part of a number of multi-word compound forms or idioms. For example, the entry in the American Heritage Dictionary, Second College edition (Houghton Mifflin Company 1985) for the word "table" has 16 noun definitions, 3 verb definitions, and 3 idioms, including "under the table," which itself has two definitions. The entry does not contain any reference to "table cloth" or "water table," which are separate entries.

This example demonstrates two problems. First, a user who selects the word "table" in the sentence. "The table is white" will be confronted with the interesting but irrelevant fact that "under the table" means "in secret" or "into a completely intoxicated state," and further that the word has a number of verb meanings. Second, user who selects the word "table" in the sentence "The water table has dropped fifteen feet" will find out all the meanings of "table," but not the desired meaning of "water table."

Assuming the dictionary were available in electronic form, the user would still derive the benefits that the lookup is faster and the information is presented on the same screen as the text, but would not have all the potential benefits that the computer could offer.

Figure 2:
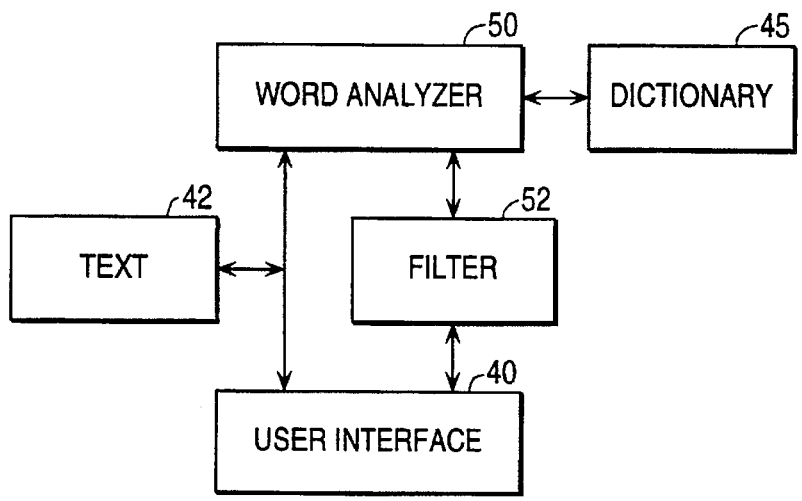
FIG. 2 is a block diagram of the operative portions of the present invention as implemented on the computer system of FIG. 1.

FIG. 2 is a block diagram showing the operative portions of the present invention as implemented on computer system 10. The keyboard or other input device and the display or other output device are shown collectively as a user interface 40. The user interface can include any devices that allow the user to communicate with the computer, including the more traditional devices as well as the less ubiquitous ones such as sound-based devices and tactile-based devices. The stored text and dictionary are shown as separate blocks 42 and 45, and the relevant portions of the programmed processor are shown as including a word analyzer 50 and a filter 52. The system takes essential advantage of the fact that text 42 and dictionary 45 are in electronic form and can thus be analyzed linguistically by word analyzer 50, which controls filter 52 so as to provide the user with information that is normally more useful than the raw dictionary data. An important aspect of the invention is that it does not have to be 100% accurate in the manner that it filters the information that it initially presents to the user, because the user always has the option of requesting additional information or all information.

Figure 3:
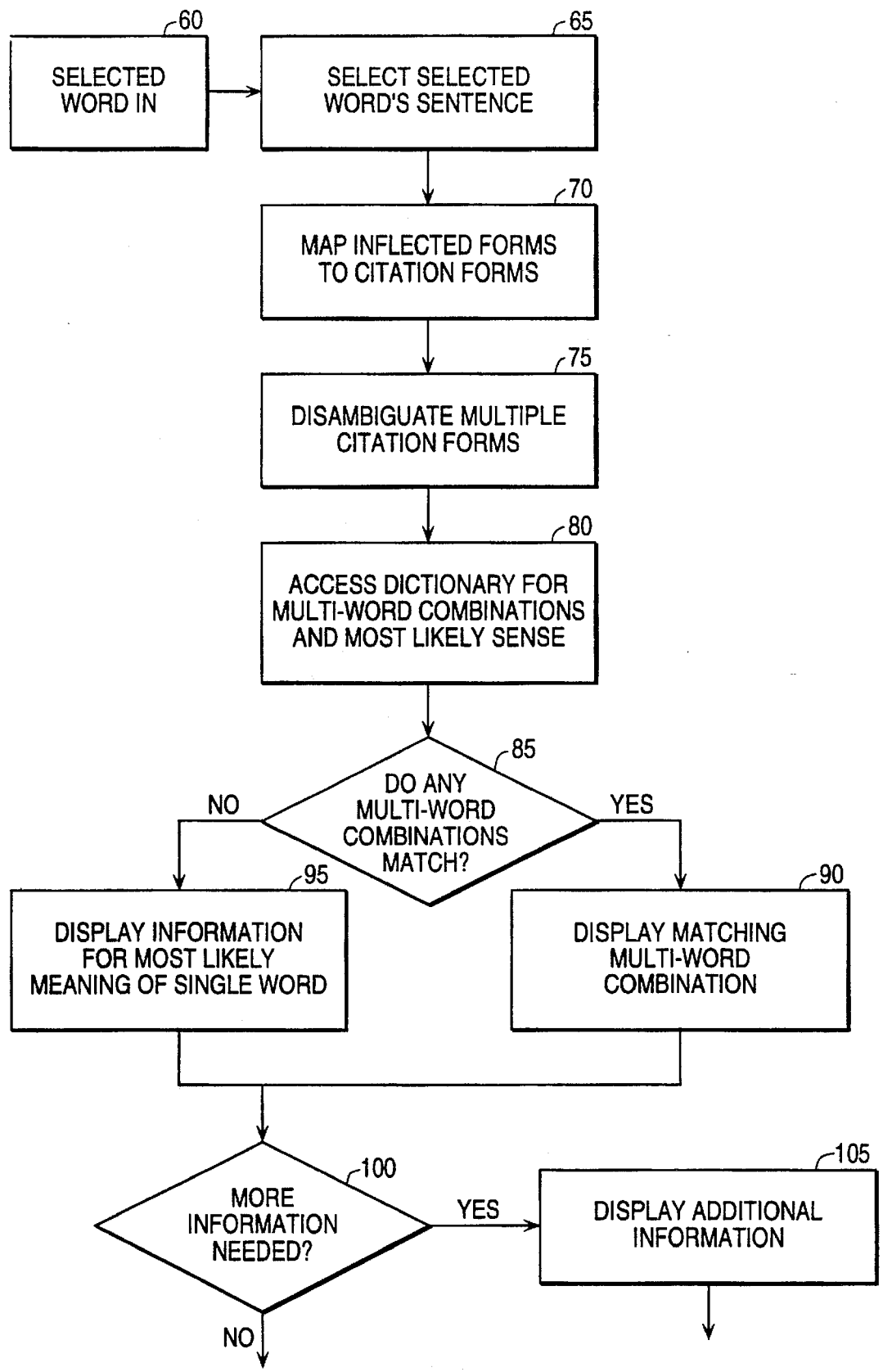
FIG. 3 is a flow diagram of a procedure according to the present invention.

FIG. 3 is a flow diagram illustrating a procedure according to the present invention for providing a user with useful information from an electronic dictionary in response to the user's selecting a word in an electronically-encoded body of text. The user first selects a word in the text, which is received by the word analyzer (step 60), and the body of text surrounding the selected word is analyzed (step 65) to select the sentence that contains the selected word. All the words in the sentence are communicated to a morphological analyzer, which analyzes each word and maps each word from its inflected form to its possible citation forms (step 70). The morphological analyzer also provides additional information (morphological tags) with each citation form. The information for each of the words is communicated to a probabilistic disambiguator, which determines the most likely citation form for each word in the sentence based on the sentence structure (step 75).

The dictionary is then accessed and all multi-word combinations (idioms and compound forms) containing the selected word are found, as well as the single word in its most probable sense (step 80). Each multi-word combination is compared to the most likely analysis of the sentence (step 85), and if one is found, it is communicated to the user (step 90). If the sentence does not contain one of the multi-word combinations, the information for the most likely meaning of the word is displayed (visually or otherwise) to the user (step 95). At this point the user can determine if the displayed information makes sense, and if not the user can request more information. The system determines whether the user wants more information (test 100), and if so communicates additional information (step 105). This additional information can take the form of the next most likely definition, or all dictionary information associated with the selected word.

Morphological Analysis of Words in Sentence

The selection of the sentence that contains the selected word is generally straightforward, at least to first order. As a general matter, a sentence will end with one of a number of punctuation marks. If quotation marks are ignored, the question mark and exclamation mark are relatively unambiguous terminators. The period is usually a terminator, but appears in certain known contexts such as salutations (for example, Mr., Ms., and Dr.) and Latin abbreviations (for example, e.g., i.e., and etc.). These occurrences of the period can be ignored and other possible sentence terminators flagged.

The text between one sentence terminator and the next (ignoring tabs, and carriage returns) can be considered to be the sentence for the purposes of the invention. While there are potential refinements on the selection of the sentence, they should be avoided if they significantly slow down the operation of the overall process. An occasional misidentification of the sentence may cause the selected word to be misinterpreted, but the user can easily request further information if the information initially displayed does not seem reasonable.

The morphological analyzer maps the inflected form of a word (also sometimes referred to as the surface form) to one or more citation forms (also sometimes referred to as the dictionary form, the lexical form, the base form, or the canonical form). Thus, associated with the word having the citation form "swim" are a number of inflected forms such as "swims" and "swam." The morphological analyzer would take a given inflected form and provide the citation form and an indication of the relationship between the two.

The morphological analyzer also provides a number of morphological tags, which supply information such as part of speech. The particular tags depend on the language. French is a highly inflected language, and the tags for the parts of speech tend to have a number of additional tags. For example, a verb will typically have an associated person, tense, mood, and number; an adjective will have an associated gender and number; and a pronoun will have an associated person, number, gender, and case. English, on the other hand, is considerably less inflected than French, so that an adjective will not normally be further qualified.

Thus, for example, the morphological analyzer would take the word "swam" and indicate that it is the past tense of the verb "to swim." However, the morphological analyzer would take the word "swim" itself, and indicate that it was the verb "to swim" or the noun "swim." Similarly, the morphological analyzer would take the word "left" and indicate that it was the past tense or past participle of the verb "to leave" or that it was the noun "left" or the adjective "left."

In a specific embodiment, the morphological analyzer is a lexical transducer (LT), which is a specific form of a finite state transducer (FST), which is itself a specific form of an finite state machine (FSM), also known as a finite state automaton (FSA).

An FSA, in the abstract, is a computing device that receives a string of symbols as input, reads the string one symbol at a time proceeding from left to right, and halts after reading the last symbol in the string. At any time, the FSA is in one of a finite number of states, having started in a designated initial state. A number of the states are designated final states, and if the FSA halts in one of the final states, it is considered to have accepted the string. If the FSA halts in a state that is not one of the final states, it is considered to have rejected the string. A control program specifies which transitions are to occur based on the symbol that is read in. An FSA is often represented pictorially as a state diagram with the states drawn as circles and the state transitions drawn as arrows (or arcs) representing possible transitions from one state to another (or possibly to the same state). A given transition is labelled by the symbol that cause the transition corresponding to that path. Designated final states are drawn as pairs of concentric circles.

An FST is an FSA used for encoding sets of ordered-pairs of data. In general, an FST can be used to represent any "regular relation," generated from a finite lists of ordered pairs by Boolean operations such as concatenation, union, iteration, etc. Once the ordered pairs are encoded as an FST data structure, that structure is used by a computer to access a member of the pair, whereupon the other, associated, member is also readily accessed. State transitions in an FST are labelled by a pair of symbols and not by a single symbol as in a simple FSA.

An LT is a specialized FST that maps citation forms (with tags) to inflected forms and vice versa. As such the term refers to a database where the representation of words is via a two-level FSA. Each word is represented by a path comprising ordered states joined by state transition arcs. The path is traversed by traversing routines to yield the represented word. Each path is used to represent the citation form of the word and an associated inflected form of the word. An LT is efficient in that the recognition and generation of known words does not require the application of any morphological rules. That is, if every inflected form of a word is stored as an ordered pair with its citation form and associated tags, then all inflected forms of the word may be accessed by accessing the citation form. This allows for bidirectional access of word forms, i.e., from the citation form to the inflected form (generating), or from the inflected form to the citation form (stemming).

Figure 4A:
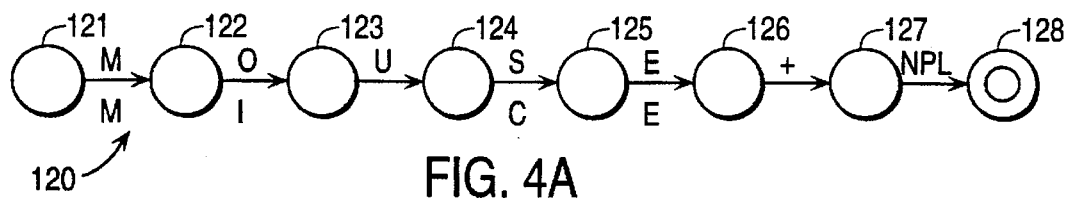
FIG. 4A shows an example of a path in a lexical transducer (LT)

FIG. 4A shows an example of a path 120 in a lexical transducer. Path 120 includes eight states including an initial state 121, a plurality of intermediate states 122–127, and a final state 128. Adjacent states are connected by arcs, each of which may have up to two symbols associated with it. Upper symbols are shown above the path; lower symbols below it. A symbol may be a character or a morphological tag as discussed below. Thus, the arc between states 121 and 122 has an upper symbol that is the character "m" and a lower symbol that is also the character "m." The arc between states 122 and 123 has upper symbol "o" and lower symbol "i." The collection of states and arcs that make up a path is ordered so that a path defines an ordered sequence of upper and lower symbols. The ordered sequence, in turn, defines a series, or string of characters for an upper word and a lower word.

Software routines are used to retrieve an inflected form of a word from a citation form in a path. While the discussion here refers to retrieving the inflected form given the citation form, it is also possible to retrieve the citation form given an inflected form of a word, as will be apparent. In the particular example, path 120 has the upper word "mouse" and the lower word "mice." The upper word is the citation form while the lower word is the inflected form.

Such a representation is useful, for example, in generating citation forms of an inflected form. This allows a word search program to perform an efficient "intelligent" search to locate forms of words where the rules for forming inflected forms of the citation form are varied and numerous. The problem of deriving inflected forms of a word from its citation form is magnified in languages such as French which include many inflected forms of a common canonical citation representation.

Given an LT including path 120, the method of mapping the inflected form "mice" to the citation form "mouse" employs software routines executing on a computer. The routines that access the LT to generate a word from a path are referred to as traversing routines. The traversing routines are given an inflected form of a word and return possible citation forms of that word. For example, where it is desired to find the single noun form of the word "mice," the traversing routine identifies paths within the lexical transducer that start with the symbol "m." In general, a state may have any number of arcs connected to it. These additional arcs are not shown in FIG. 3A, but the effect of their presence means that the traversing routine must make a decision at a state with two or more arcs emanating from it as to which arc to follow. The possibility of having more than one arc joined to a state allows arcs to be used in more than one path as discussed in detail below.

In order to perform the mapping of inflected to citation form, the traversing routine starts at initial state 121. In this example, state 121 is common to all other paths, even though other paths are not shown. From the initial state, an arc is sought with a lower symbol that matches the first character in the inflected word. In this case, the letter is "m," so the routine follows the arc having that lower symbol.

The upper symbol, which also happens to be an "m," is retrieved and stored in a list. Additional upper symbols are obtained as the traversing proceeds and stored in the list in order to create the citation form of the word. The storing of upper and lower symbols within the lexical transducer, and the association of symbols with arcs can be by any means known in the art. In the existing prototype, the C programming language is used.

Note that the arc between states 123 and 124 has an upper symbol "u" but no lower symbol (actually a lower symbol that is null). As a result of traversing this arc, the symbol "u" is added to the list. Upon further traversal of the path, characters "s" and "e" are added to the list. At the arc between states 126 and 127, the symbol "+Npl" is encountered as an upper symbol. This is a morphological tag that represents information that the inflected form associated with this path is a plural noun form of the word "mouse." Because state 128 is marked as a final state, the traversing routine terminates and the assembled citation form, along with its morphological tag is returned as output.

Figure 4B:
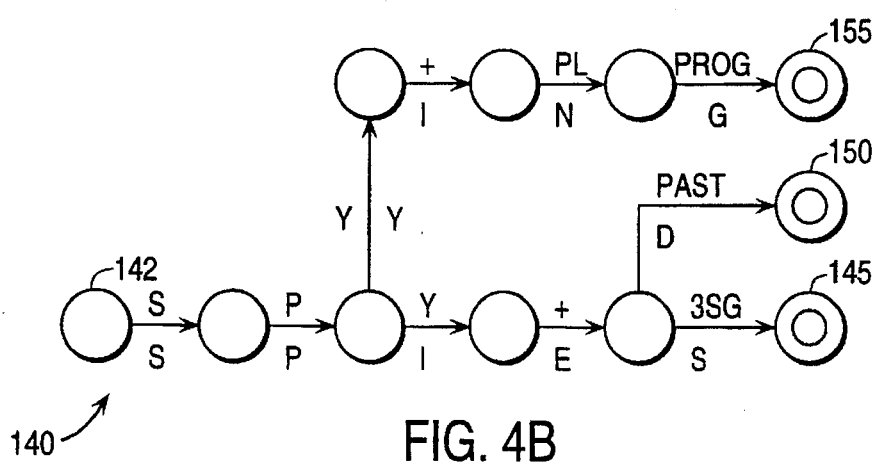
FIG. 4B shows a portion of an LT having three paths mapping three different inflected forms of a word to its citation form and morphological tags.

FIG. 4B shows a portion of an LT 140 having three paths mapping three different inflected forms of the word "spy" to its citation form and morphological tags. A first path starts at an initial state 142 and ends at a first final state 145. This first path maps the third person singular inflected form of the word, namely "spies," to the citation form, and also provides the tags "+" and "3Sg." A second path also starts at initial state 142, but branches off from the first path and ends at a second final state 150. This second path maps the past tense inflected form of the word, namely "spied," to the citation form and also provides the tags "+" and "Past." A third path starts at initial state 140 and ends at a third final state 155 to map the plural progressive inflected form, namely "spying," to the citation form and provides the tags "+," "Plur," and "Prog."

In actual practice, an LT is a large data structure. By way of numerical example, an LT for the English language has on the order of 50,000 states, 100,000 arcs, and 225,000 distinct paths. An LT for the French language is about the same overall size, having comparable numbers of states and arcs, but due to the nature of the language, has on the order of 5,700,000 distinct paths.

Disambiguation of Multiple Citation Forms

As described in detail above, the output from the morphological analyzer consists of all the citation forms, each tagged with morphological codes (tags) that describe the word in question, for each of the words in the sentence that contains the selected word. The literature describes many techniques for performing part-of-speech analysis to distinguish among different citation forms (and tags) that are mapped from a common inflected form. The presently preferred technique is a statistical method based on a hidden Markov model. A significant aspect of the present invention is that it does not require complete accuracy in the disambiguation since the user is always able to request more information if the initially displayed information appears incorrect. Statistical methods are inherently less than 100% accurate, which may render many of them unsuitable for some applications, but not for the present one.

Hidden Markov modeling is a statistical technique commonly used in speech recognition to model variability in the speech to be recognized. Such variability results not only from different speakers, but from different rates of speaking. In the present invention, hidden Markov modeling is applied to part-of speech recognition. Here, the variability results from the fact that a given inflected form can map to a number of different citation forms.

A hidden Markov model (HMM) consists of a set of states, with probabilistic transitions between states, and probability distributions of observed feature vectors associated with each state. In speech recognition, these feature vectors represent the spectral content of the speech at a given time. In the word analysis system, the feature vector consists of the syntactic information of the words in the sentence. Transitions between states specify the sequence of observations. By associating probabilities with the transitions between states, as well as with the observations of each state, HMMs can be used to statistically model variability in speech or word usages.

More formally, an HMM consists of a set of N states $S_1 \ldots S_N$, a set of transition probabilities $a_{ij}$, i=1 ... N, j=1 ... N, where $a_{ij}$ is probability of a transition from state i to state j, and a set of probability distributions $b_i(x)$, i=1 ... N, where $b_i(x)$ is the probability of being in state i and observing feature vector x.

Recognition using HMMs can be performed as follows. Each object to be recognized is modeled by an HMM. A given observation sequence X of length T ($X=x_1 \ldots x_T$) is recognized as the object corresponding to the HMM determined most likely to have generated the sequence X. One way of doing this is by computing the likelihood of X given each HMM, using the forward algorithm. (For example, see L. R. Rabiner, "A Tutorial on Hidden Markov Models and Selected Applications in Speech Recognition," *Proc. IEEE*, Vol. 77, No. 2, February 1989, pp. 257–285). A more efficient method is the Viterbi algorithm, which proceeds as follows. The HMMs for each object to be recognized are connected in parallel to form a network. Given a sequence of observations $X=x_1 \ldots x_T$, the Viterbi algorithm (Rabiner, supra) can be used to find the sequence of states through the network that most likely generated the sequence X. Because each state sequence is specific to the HMM of one of the objects to be recognized, the optimal state sequence specifies the object to be recognized.

The parameters for an HMM are the transition probabilities $a_{ij}$ and the observation probabilities $b_i(x)$. These parameters can be learned by training the HMM with a set of observation sequences X known to have been generated by the object modeled by the HMM. An algorithm known as the Baum-Welch procedure (Rabiner, supra) is commonly used.

The disambiguation procedure is based largely on the parts of speech associated with the words, and yields a set of possible contexts of the selected word, differentiated by probability. The citation form of the most probable analysis of the selected word, as well as the most probable citation forms of the other words in the sentence, are used for the initial dictionary lookup to be described below. Since there is at least some chance that the sentence analysis has led to an incorrect analysis for the selected word, it is generally preferred to save at least some of the other less probable sentence analyses in the event that the user requests additional information.

A detailed description of a particular HMM-based system for part-of-speech tagging can be found in Julian Kupiec, "Robust part-of-speech tagging using a hidden Markov model," *Computer Speech and Language* (1992) 6, 225–242, incorporated by reference for its teachings. The system described in the publication correctly tags approximately 96% of the text, and is applicable to languages other than English, including French.

It should be noted that the morphological analysis is characterized by relatively fine resolution compared to the disambiguation, which depends largely on the parts of speech of the words in the sentence. To the extent that there is a significant computational penalty incurred in the part of the process having the higher resolution, it is possible to use a coarser version of that part of the process. Put another way, it is possible to match the resolution of the finer part of the process to the coarser part without a significant loss.

Dictionary Lookup and Display of Information

The LT that maps the inflected forms of the words to their citation forms preferably also maps each citation form to a unique number to facilitate data compression and dictionary lookup. The dictionary information for a given word also preferably includes pointers to all multi-word combinations containing the word. It should be noted that most dictionaries do not systematically link multi-word combinations, the case of "table" and "water table" discussed above being but one example. While a user familiar with the English language would probably recognize that "water table" might not be found under the entry for "table," a user with only a general knowledge of the language might not recognize that fact.

Linking all multi-word combinations is necessary to give the user the opportunity to obtain the correct meaning, but is not sufficient to prevent the user from getting too much information. An example from French will illustrate this point. A user, presented with the word "provenance" in the context or "en provenance de" does not need to know that the word "provenance" generally means "origin" or that "pays de provenance" means "the country a product is imported from but not necessarily where it is produced." Rather, the user need only know that "en provenance de" means "from."

Thus a quick and accurate way to filter the information is to check whether the selected word is part of a known multi-word combination indexed to the selected word, and if so, to display the meaning of that multi-word combination. If the selected word is not in the context of a known multi-word combination, information regarding one or more senses of the single-word citation form are displayed. It is generally unlikely that the disambiguator could distinguish between the various definitions of a particular citation form. For example, the noun "table" can mean something other than a piece of furniture with a horizontal flat surface. Thus it is likely that all noun definitions of the word "table" would be displayed, but known multi-word forms that are not present in the sentence would not be displayed, nor would information relating to the verb form of the word.

If the user is not satisfied with the displayed information, more information can be requested. There are a number of possibilities for displaying additional information, including allowing the user to request a particular level of additional information. The smallest amount of additional information would be an additional sense of the same citation form (i.e., the citation form that was determined by the disambiguator to be the most probable), assuming that only some of the senses were initially displayed. The greatest amount of additional information would be all the information relating to all citation forms of the selected word. Intermediate between the two extremes would be to display the results of one of more of the other (less probable) sentence analyses, with possible information on other multi-word combinations appropriate to such other contexts.

Encoding Multi-Word Combinations

Figure 5:
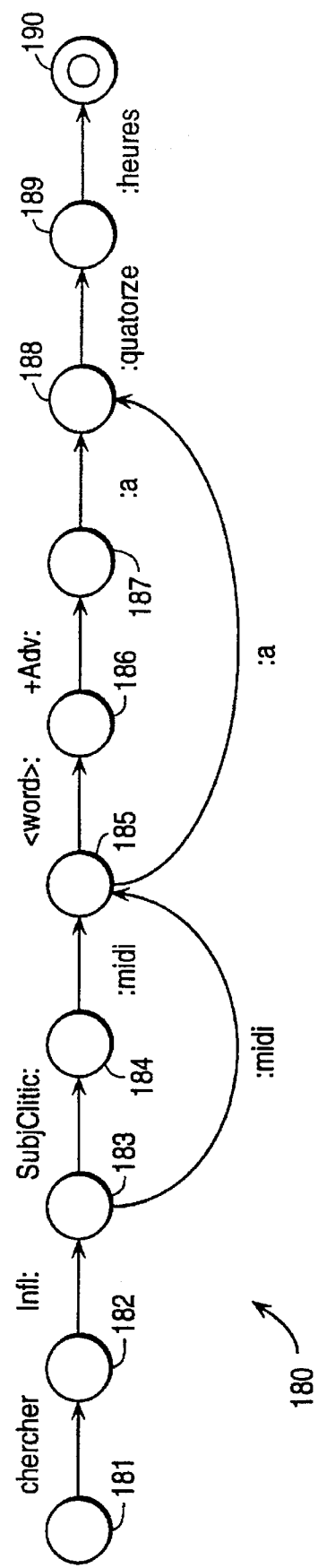
FIG. 5 shows a portion of an finite state automaton (FSA) for encoding a multi-word idiom.

FIG. 5 shows a portion of an FSA 180 that encodes a particular idiom as a regular expression. The particular idiom is "chercher midi . . . à quatorze heures," the literal meaning of which is "to look for noon at 2 o'clock." The Collins French/English dictionary translates this idiom as "to complicate the issue, to look for complications."

This idiom has a fixed part "à quatorze heures" (at two o'clock), a free slot ( . . . ) in which certain adverbials could be inserted, such as "toujours" (always), and a variable part "chercher" (to look for), which could be replaced by any other form of the same verb ("cherchait," "cherchât," "chercheront," "cherchez-vous," etc.) without losing the idiomatic meaning.

To represent the multitude of possible variants of the idiom in a concise way, it is advantageous to encode it as a regular expression. By well-known algorithms, the regular expression can be converted to an FSA, which provides an efficient way of determining whether the idiom is present in any given sentence.

In the encoding of the idiom, advantage is taken of the fact that the LT provides a two-level representation of the text: on one side are the actual words in the text, on the other side are the canonical citation forms and morphological tags. The distinction is marked with colons in specifying the idiom as a pattern. A colon after an element (chercher:) indicates that it is a lexical form that may have any number of surface realizations, a colon before an element (:midi) indicates that it is a surface element and has to match the text exactly.

A schematic representation of the idiom as a two-level regular relation is given below:

chercher: Infl: (SubjClitic:) :midi (<word>: +Adv:) :à :quatorze :heures where "Infl:" is an abbreviation for all combinations of tense and mood, number and person markings, "SubjClitic:" stands for cliticized subject of inverted questions as in "cherchez-vous" (are you looking . . . ), and "<word>:+ Adv:" is a pattern that matches the lexical form of any adverb. The round parentheses indicate optionality.

The illustrated portion of FSA 180 includes nine states including an initial state 181, a plurality of intermediate states 182–189, and a final state 190. Skip arcs between states 183 and 185 and between states 185 and 188 are required by the optional nature of the cliticized subject and the adverb.

Conclusion

In conclusion it can be seen that the present invention allows a user to interact with and derive the full benefit of an electronic dictionary. The invention makes a reasonable attempt to provide the user the most useful information, but the user retains the ability to request additional information.

While the above is a complete description of the preferred embodiments of the present invention, various modifications, alternative constructions, and equivalents can be used. Therefore, the above description and illustration should not be taken as limiting the scope of the invention which is defined by the claims.

What is claimed is:

1. For use with a first body of electronically encoded text having words in sentences and an electronically encoded dictionary having information about at least some of the words in the text and about multi-word combinations, a method for retrieving information from the dictionary, the method comprising the steps of:

selecting a word from within the first body of text;

communicating a second body of text immediately surrounding the selected word and including the selected word to a morphological analyzer, said second body of text having a sentence structure;

analyzing and mapping each word in the second body of text from its inflected form to its possible citation forms with said morphological analyzer;

communicating the possible citation forms to a probabilistic disambiguator, wherein said disambiguator determines a most probable citation form for each word in the second body of text based on said sentence structure of said second body of text;

communicating the most probable citation form of the selected word to the dictionary;

determining whether any of the multi-word combinations in the dictionary match a portion of the second body of text containing said selected word;

if a matching multi-word combination is found, communicating a meaning contained in the dictionary and associated with the matching multi-word combination to a user and after said communicating step, allowing said user to request a meaning contained in the dictionary and associated with the most probable citation form of the selected word;

if a matching multi-word combination is not found, communicating the meaning contained in the dictionary and associated with the most probable citation form of the selected word to the user;

allowing the user to request additional information; and communicating to the user additional information in response to the request for additional information.

2. The method of claim 1 wherein the morphological analyzer is implemented as a finite state transducer.

3. The method of claim 1 wherein said step of determining the most probable citation form for each word in the second body of text is performed using a hidden Markov model.

4. The method of claim 1 wherein the dictionary meaning and the additional information is communicated to the user by a visual display.

5. The method of claim 1, wherein said additional information is a meaning contained in the dictionary and associated with the next most probable citation form, said method further comprising the steps of:

allowing the user to request all available dictionary information associated with the selected word other than the meaning associated with the most probable citation form;

communicating all citation forms of the selected word other than said most probable citation form to the dictionary;

communicating to the user all meanings contained in the dictionary and associated with all citation forms other than the most probable citation form.

6. The method of claim 1, further comprising the following steps after said request for additional information step:

determining a set of possible citation forms of the selected word with said probabilistic disambiguator, said determination based on a set of probabilistic states of the selected word within said sentence structure of the second body of text, wherein said set of possible citation forms is differentiated by the probability of a particular citation form being the correct citation form; and allowing the user to select a level of said set of possible citation forms, wherein said additional information are all meanings contained in the dictionary and associated with all citation forms of the selected level other than the most probable citation form.

7. For use with a first body of electronically encoded text having words in sentences and an electronically encoded dictionary having information about at least some of the words in the text and about multi-word combinations, a method for retrieving information from the dictionary, the method comprising the steps of:

selecting a word from within the first body of text;

communicating a second body of text immediately surrounding the selected word and including the selected word to, a morphological analyzer, said second body of text having a sentence structure;

analyzing and mapping each word in the second body of text from its inflected form to its possible citation forms with said morphological analyzer;

communicating the possible citation forms to a probabilistic disambiguator, wherein said disambiguator determines a most probable citation form for each word in the second body of text based on said sentence structure of said second body of text;

communicating the most probable citation form of the selected word to the dictionary;

determining whether any of the multi-word combinations in the dictionary match a portion of the second body of text containing said selected word;

if a matching multi-word combination is found, displaying a meaning contained in the dictionary and associated with the matching multi-word combination to a user and after said displaying step, allowing said user to request a meaning contained in the dictionary and associated with the most probable citation form of the selected word;

if a matching multi-word combination is not found, displaying the meaning contained in the dictionary and associated with the most probable citation form of the selected word to the user;

allowing the user to request additional information;

in response to a request by the user for additional information, communicating all citation forms of the selected word other than said most probable citation form to the dictionary, wherein said additional information are all meanings; contained in the dictionary and associated with all citation forms other than the most probable citation form; and displaying to the user said additional information.

\* \* \* \* \*